Feb. 20, 1962

D. H. LANCTOT 3,022,474

MICRO-WAVE ATTENUATOR

Filed Jan. 8, 1960

INVENTOR
DONALD H. LANCTOT
BY
Elliott & Pastoriza
ATTORNEYS

Feb. 20, 1962 D. H. LANCTOT 3,022,474
MICRO-WAVE ATTENUATOR
Filed Jan. 8, 1960 2 Sheets-Sheet 2
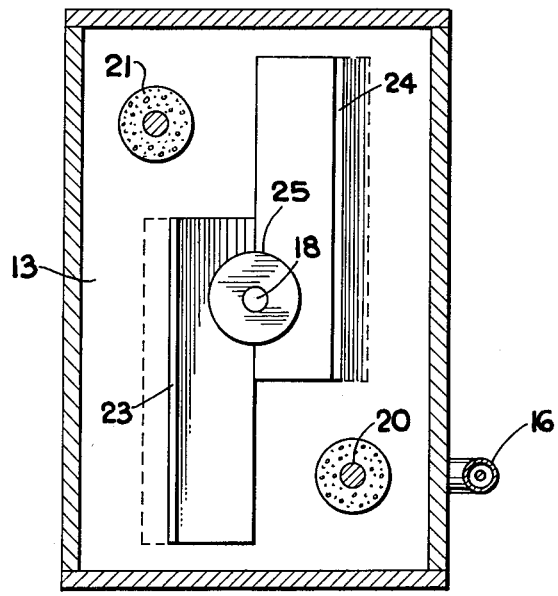
FIG. 3
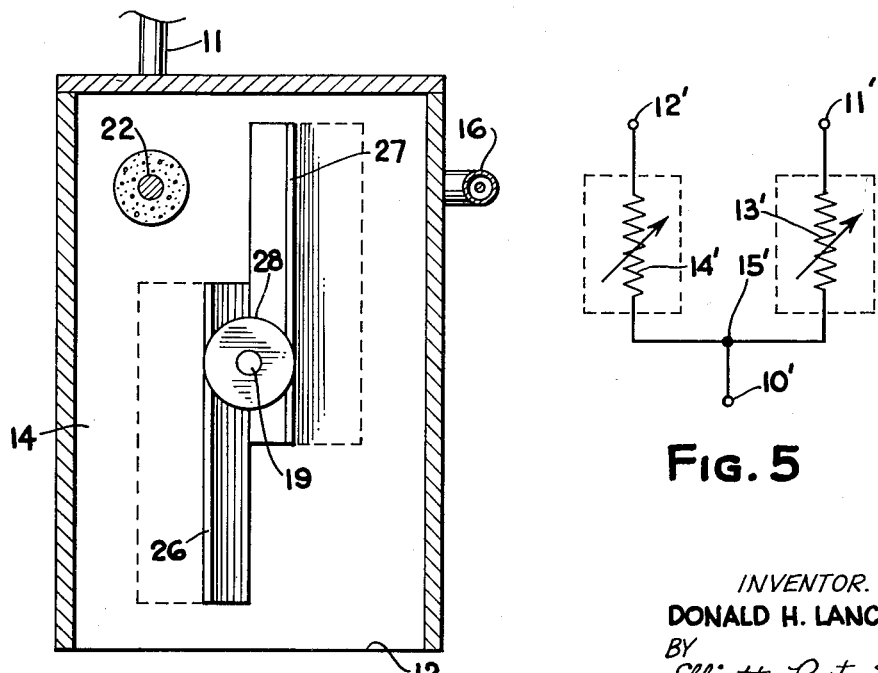
FIG. 4
FIG. 5
INVENTOR.
DONALD H. LANCTOT
BY
Elliott & Pastoriza
ATTORNEYS

United States Patent Office 3,022,474
Patented Feb. 20, 1962

3,022,474
MICRO-WAVE ATTENUATOR
Donald H. Lanctot, Malibu, Calif., assignor to Don-Lan Electronics, Inc., a corporation of California
Filed Jan. 8, 1960, Ser. No. 1,326
6 Claims. (Cl. 333—81)

This invention relates generally to micro-wave components and more particularly to a novel power divider and duplex attenuator for high frequency electromagnetic energy.

In micro-wave components for transmitting, receiving, attenuating, dividing or simply connecting wave carriers, the physical design is of the utmost importance. This is because the wave lengths of the energy involved at the particular operating frequencies are of the order of the physical dimensions of the components themselves.

Further, since the energy is in the form of the electromagnetic radiations rather than simple currents as is the case with low frequency electrical systems, techniques for attenuating, impedance matching, and so forth are quite different from those employed in conventional electrical circuitry. For example, it is important that smooth passages be provided in wave guides to avoid reflections. Similarly, in cavity resonators, it is important that the conducting walls be continuous and protuberances, which might affect the various electric and magnetic resonant field configurations within the chamber be avoided. On the other hand, the physical nature of the electromagnetic field and its responsiveness to changes in dimensioning or foreign protuberances within a carrier thereof can be taken advantage of in the construction of attenuators.

One of the more important requirements in microwave apparatus such as employed, for example, in radar systems is some means for dividing the electromagnetic energy into two branches and then effecting individual attenuation of the power in each branch. For example, when a single antenna is connected to both a transmitter and receiver, the power received by the antenna for the receiver should be isolated from the transmitter, and power fed to the antenna from the transmitter should be isolated from the receiver. Also, in the control of power output from klystron oscillators it is desirable to provide attenuators which will, in their inoperative position, provide complete transmission and yet when varied will gradually attenuate the power involved.

It is also important that components for carrying out these functions be of compact construction particularly when employed in missile guidance systems.

With the foregoing in mind, it is a primary object of the present invention to provide an improved micro-wave component for dividing and individually attenuating electromagnetic energy.

More particularly, it is an object to provide an improved power divider and duplex attenuator structure in which input electromagnetic energy is divided between first and second outputs and in which either one of the outputs may be individually controlled to attenuate the particular signal therein.

Still another important object is to provide a power divider and duplex attenuator which is compact in design and which may be readily adapted for connection to either co-axial lines or direct to wave guides without any major alteration in the components making up the structure.

An auxiliary object is to provide an improved attenuator for high frequency electromagnetic energy.

Briefly these and many other objects and advantages of this invention are attained by providing first and second wave guide chambers secured together in back-to-back relationship. These chambers are respectively provided with first and second attenuation means in the form of novel hinged vane structures which will attenuate electromagnetic energy passing through the chambers. An input means is provided and in co-operation with a junction structure divides the input energy between the first and second chambers. Separate output means are then provided for passing energy from each of the chambers.

If it is desired that the outputs connect directly to wave guides, one end of each of the chambers may be left open or terminated in a conventional wave guide flange structure. Alternatively, suitable output co-axial probes passing from the chambers may be employed and terminated in co-axial connectors. In the event co-axial output connectors are to be used, the open end of the wave guide chambers are closed. By this arrangement, the structure is readily adaptable to various different types of connections.

The attenuation means in each of the chambers itself is individually adjustable from the exterior of the structure and is designed such that when no attenuation is desired, the presence of the attenuation vane structure within the chamber is substantially invisible to electromagnetic radiation.

A better understanding of the invention as well as further features and advantages thereof will be had by now referring to a preferred embodiment as illustrated in the accompanying drawings, in which:

FIGURE 3 is another cross section taken in the direction of the arrows 3—3 of FIGURE 1;

FIGURE 4 is still another cross section taken in the direction of the arrows 4—4 of FIGURE 1; and FIGURE 5 is a simple schematic diagram of the equivalent electrical circuit for the system of FIGURE 1.

Figure 1:
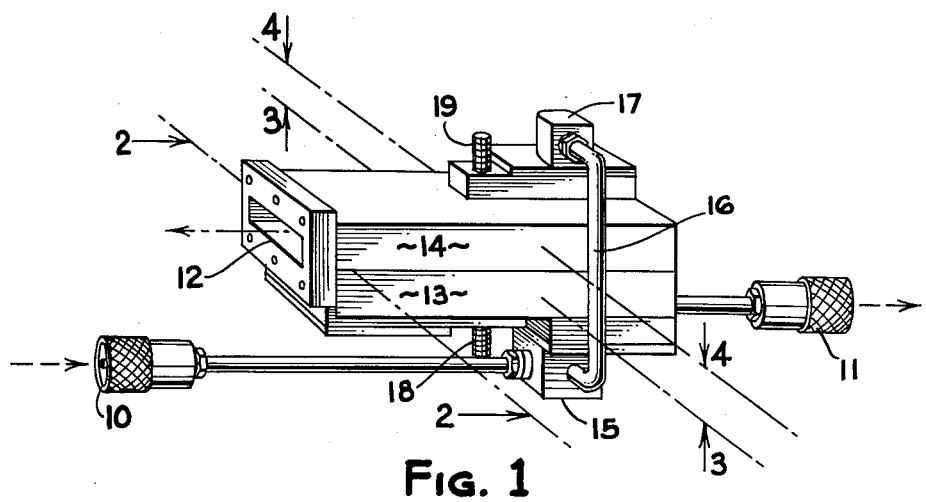
FIGURE 1 is an overall perspective view of the power divider and duplex attenuator of this invention.

Referring first to FIGURE 1, there is shown an input co-axial connector 10, a first output co-axial connector 11 and a second output means in the form of a wave guide connecting flange 12. Power passed into the input connector 10 will be divided between the first and second outputs 11 and 12. In the example chosen in FIGURE 1, the output 12 can be connected directly to a wave guide transmission system whereas the output 11 is adapted for connection to a further co-axial line or to a co-axial input terminal for a particular piece of equipment.

The power passed to the outputs 11 and 12 is received from first and second wave guide chambers 13 and 14. Input energy to the chamber 13 is effected by a junction 15 which supports a first input probe projecting directly into the chamber 13 as will become clearer with reference to FIGURE 2. The junction 15 also passes input energy through a branch co-axial line 16 terminating in a junction 17 feeding a second input probe to the chamber 14. Attenuation of the divided energy is achieved within the wave guide chambers 13 and 14 by adjustable attenuation means. The degree of attenuation can be controlled externally for each of the chambers respectively by adjustment screws 18 and 19.

Figure 2:
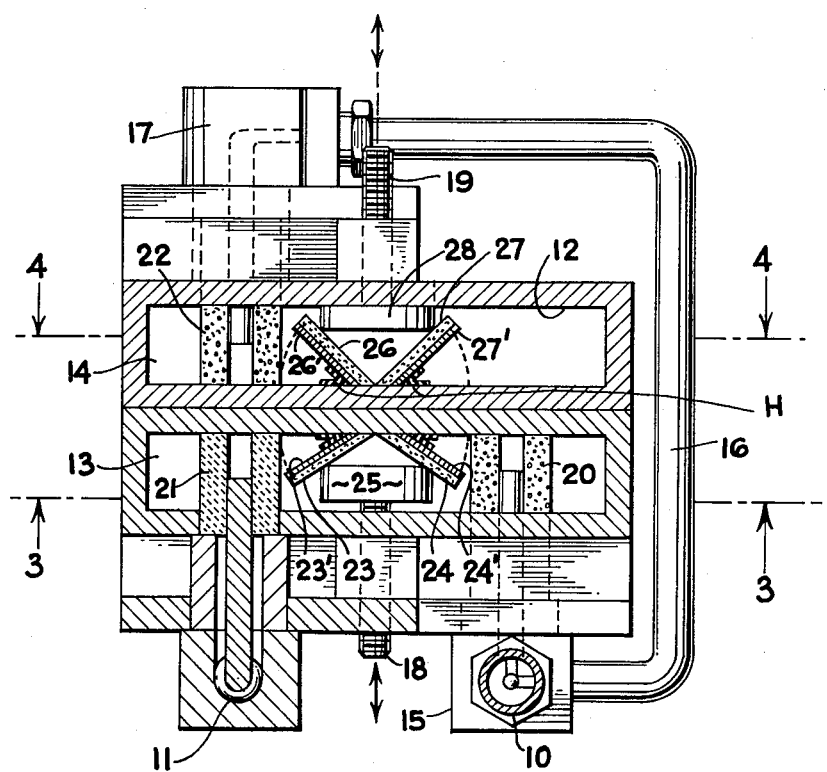
FIGURE 2 is a cross section taken in the direction of the arrows 2—2 of FIGURE 1.

Referring to the cross sectional view of FIGURE 2, the first input probe to the chamber 13 connecting from the junction 15 is clearly illustrated at 20. The portion of energy received within the wave guide chamber 13 is in turn passed to the output co-axial connector 11 described in connection with FIGURE 1 by an output pick-up probe 21.

With respect to the upper wave guide chamber, the divided input energy passing up the branch co-axial line 16 and into the junction 17 is received in the chamber 14 by the input probe 22. The energy is removed from the chamber through the end opening 12 which, as described in connection with FIGURE 1, connects to a wave guide system.

The attenuation means for the chamber 13 constitutes a first pair of dielectric strips 23 and 24 hinged together and to the upper internal wall surface of the chamber to form an inverted V shape. The outside surfaces of these strips in turn are provided with a resistive coating as indicated respectively at 23' and 24'. The hinging of the strips includes small flexed rubber hinges H outside the vertex of the inverted V. These resilient hinges tend to bias the strips towards a position in which their planes are normal to the wave guide wall so as to decrease the angle of divergence thereof.

The adjustment screw 18 referred to in FIGURE 1 is threaded into the opposite or lower wall of the wave guide chamber 13 and terminates in an enlarged dielectric head 25 receivable in the open V portion of the strips or vanes to engage the inside surfaces thereof simultaneously. By this arrangement, threading inwardly of the screw and dielectric head 25 tends to force the vanes wider apart until at the maximum threaded position, the vanes are flush with the upper internal wall of the wave guide. The coatings 23' and 24' are in substantially complete surface contact with the conducting surface of the chamber wall so that the vanes in such position are substantially invisible to electromagnetic radiation within the chamber.

The attenuation means in the upper chamber 14 similarly comprises a pair of vanes 26 and 27 secured together along longitudinal edges and hinged to the bottom wall of the chamber to form a V shape with the bisector of the V substantially normal to this bottom wall. Vanes 26 and 27 are also provided with resistive coatings 26' and 27' on their outer sides and are biased towards a normal position by suitable rubber hinges H. The adjustment screw 19 as in the case of the screw 18 passes into the opposite or upper wall in the case of the chamber 14 to terminate in a dielectric head 28 engaging simultaneously inside portions of the vanes. Threading down on the screw 19 will thus urge the vanes towards a flush position with the wall.

The physical arrangement as described in connection with FIGURE 2 can be better understood by reference to FIGURES 3 and 4. To illustrate the manner in which the variation in attenuation can take place, the vanes in chamber 13 are shown in a position to effect less attenuation than the vanes in the chamber 14. Thus, the lesser the extent into the interior volume of the chamber effected by the vanes, the less will be the attenuation and the greater the extent thereinto, the greater will be the attenuation. By staggering the vanes 23 and 24 and 26 and 27 as illustrated in FIGURES 3 and 4 respectively, there is provided room for the feed probe 20 and output probe 21, and for the feed probe 22. At the same time, the vanes may be made sufficiently long to effect the desired degree of attenuation without interfering with the various input and output probes.

With particular reference to FIGURE 4, it will be noted that in the lower righthand portion of the chamber there is ample room for a second output probe corresponding to the output probe 21 of FIGURE 3. Such output probe would be provided if the front opening 12 of the wave guide chamber 14 were closed off. It will thus be seen that the structure is adaptable to either coaxial or wave guide connection with only minor modification. Similarly, the lower chamber 13 could have one of its ends removed to provide a wave guide output as a substitute for the output probe structure 21.

FIGURE 5 illustrates the electrical equivalent of the power divider and duplex attenuator. It should be understood that the wave guide chambers 13 and 14 function as resonant chambers and the attenuation is effected within these cavities. Thus the attenuation in FIGURE 5 is represented by the variable resistances 13' and 14' enclosed within the dotted line boxes representing the chambers. The primed numerals in FIGURE 5 designate the electrical elements constituting counterparts of the components designated by the same numerals without primes in FIGURES 1–4.

In the operation of the device, power is passed to the connector 10 and first and second outputs are derived from the output connector 11 and wave guide flange connector 12. The adjustment screws 18 and 19 can be threaded to an extent to provide the desired degree of attenuation in each of the outputs. As stated, by threading the adjustments to their maximum inward extent, the vanes are held in flush engagement with the walls to which they are hinged so that the resistive coatings thereof make substantially complete surface contact and the vanes are thus invisible to electromagnetic energy and minimum attenuation occurs. On the other hand, unthreading of the screws to raise the dielectric heads permits the vanes to flex upwardly into V shapes as a consequence of the resilient hinging arrangement and thus gradually increase the attenuation in the chambers.

It will be noted that the walls of the wave guide chambers 13 and 14 are maintained electrically continuous by making the adjustment screws 18 and 19 conductive. There are thus avoided any appreciable breaks in the surface continuity of the walls. Moreover, the vane structures themselves which effect the attenuation are wholly within the chamber and do not require the presence of slots or the like in the chamber walls by which their extent in the chamber can be adjusted. By employing double vanes in the V shapes as described, a greater attenuation range can be achieved as compared to employing a single hinged vane. On the other hand, it should be understood that the principles of the invention apply to simply a single vane hinged along one edge to one of the walls of the wave guide and actuated in a similar manner by suitable adjustment means.

In addition to the foregoing features, the back-to-back configuration of the chambers results in an extremely compact design which feature is important in systems wherein space is at a premium.

Various modifications falling within the scope and spirit of this invention will readily occur to those skilled in the art. The power divider and duplex attenuator as well as the attenuation construction in itself are therefore not to be thought of as limited to the particular embodiments set forth merely for illustrative purposes.

What is claimed is:

1. An attenuator for high frequency electromagnetic energy comprising, in combination: a wave guide chamber having input and output means for passing said high frequency electromagnetic energy therethrough; a pair of vanes in the form of elongated strips, the longitudinal edge of one strip being hinged to a longitudinal edge of the other strip so that the vanes define a V shape in cross-section, the vertex of said V shape being hinged along a longitudinal central internal surface portion of one wider dimensioned wall of said chamber so that the bisector of said V is substantially normal to said surface; resistive coatings on the outer sides of said strips respectively; and a single actuating screw passing normally through the wall of said chamber opposite said one wall and in alignment with said bisector, said screw terminating in said chamber in an enlarged head of dielectric material passing into the open end of said V-shape to engage simultaneously the inner sides of said strips, whereby threading of said screw to move said head further into said V shape simultaneously rotates said strips in opposite directions to increase the angle of divergence of said strips and thereby decrease the attenuation of said energy in said chamber by said strips.

2. The subject matter of claim 1, in which said head is movable into said V-shape to an extent to cause both said strips to lie flush on said one wall with said resistive coatings in substantially complete surface contact therewith whereby said vanes are invisible to said electromagnetic energy.

3. The subject matter of claim 2, including means biasing said vanes in rotative directions tending to decrease their angle of divergence whereby unthreading of said actuating screw to move said head in a direction away from said vertex increases the attenuation effected by said vanes.

4. A power divider and duplex attenuator for high frequency electromagnetic energy, comprising, in combination: first and second wave guide chambers; an input means for dividing and passing said electromagnetic energy into said first and second chambers respectively; first and second output means for said first and second chambers respectively; first and second attenuation means within said first and second chambers; and first and second independent actuating means for independently adjusting said attenuation means respectively whereby the power of said electromagnetic energy passed into said input means is divided and attenuated when passed out of said first and second output means, said first and second chambers being secured together with their wider dimensioned walls in back-to-back relationship, said first and second attenuation means comprising pairs of vanes hinged together along one edge and to the interior surfaces of said wider dimensioned back-to-back walls of said chambers to define, respectively, inverted and upright V-shapes when said chambers and vanes are viewed in cross-section; and said first and second actuating means extending normally through the respective opposite walls of said chambers to be received in the open ends of said V-shapes and engage the inner sides of said vanes respectively, whereby the vertex angles of said V-shapes may be independently changed from the exterior of said chambers in response to movement of said actuating means.

5. The subject matter of claim 4, in which each of said vanes is in the form of an elongated strip of dielectric material the sides thereof defining the outes sides of said V-shapes including resistance coatings.

6. The subject matter of claim 5 in which the two vanes of each of said pairs are longitudinally off-set to provide room in said chambers for said input and output means.

References Cited in the file of this patent

UNITED STATES PATENTS

| | | |
|---|---|---|
| 2,532,817 | Lafferty | Dec. 5, 1950 |
| 2,594,978 | Nelson | Apr. 29, 1952 |
| 2,646,551 | Roberts | July 21, 1953 |
| 2,656,518 | Good | Oct. 20, 1953 |
| 2,709,789 | Worrell | May 31, 1955 |
| 2,830,275 | Zaleski | Apr. 8, 1958 |
| 2,870,418 | Hewitt | Jan. 20, 1959 |